United States Patent
Rumsby

(10) Patent No.: US 10,609,100 B2
(45) Date of Patent: Mar. 31, 2020

(54) SYSTEMS, APPARATUSES AND METHODS FOR PARTY LINE CALLS AMONG VOICE OVER INTERNET PROTOCOL (VOIP) TELEPHONES

(71) Applicant: Hubbell Incorporated, Shelton, CT (US)

(72) Inventor: Richard Crampton Rumsby, Staffordshire (GB)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/916,387

(22) Filed: Mar. 9, 2018

(65) Prior Publication Data

US 2018/0278662 A1    Sep. 27, 2018

Related U.S. Application Data

(60) Provisional application No. 62/469,620, filed on Mar. 10, 2017.

(51) Int. Cl.
*H04L 12/26* (2006.01)
*H04L 29/06* (2006.01)
(Continued)

(52) U.S. Cl.
CPC ...... *H04L 65/4053* (2013.01); *H04L 65/1006* (2013.01); *H04L 65/1069* (2013.01);
(Continued)

(58) Field of Classification Search
CPC . H04M 3/561; H04M 3/567; H04L 29/06414; H04L 12/1813
See application file for complete search history.

(56) References Cited

U.S. PATENT DOCUMENTS 6,717,938 B1    4/2004  D'Angelo
6,963,353 B1 *  11/2005 Firestone ............... H04N 7/147
                                                    348/14.08
(Continued)

OTHER PUBLICATIONS

International Search Report and Written Opinion of the International Searching Authority dated Jul. 11, 2018, which issued in the corresponding PCT Patent Application No. PCT/US2018/21122.
(Continued)

*Primary Examiner* — Siren Wei
(74) *Attorney, Agent, or Firm* — Dickinson Wright PLLC

(57) ABSTRACT

Devices, systems and methods are provided to support a party call with auto joining function in a communication system for a distributed transport system that employs VoIP technology. A VoIP unit or end point acts as a conference bridge between an operator extension and other end points. A first end point makes a SIP call to the operator and multicasts a mix of its send audio and the received operator audio. Other end points first check for multicast traffic being received before making a SIP call to the operator and, if so, play out the received audio over its speaker and multicast its send audio. The end point initiating the call mixes this subsequent stream into a stream to the operator, effectively acting as the conference bridge to the operator. The other end points are responsible for mixing received multicast streams for their local speaker.

9 Claims, 4 Drawing Sheets

(51) Int. Cl.
*H04M 1/253* (2006.01)
*H04M 1/60* (2006.01)
*H04M 1/2745* (2020.01)

(52) U.S. Cl.
CPC ...... *H04L 65/1073* (2013.01); *H04L 65/4076* (2013.01); *H04M 1/2535* (2013.01); *H04M 1/6033* (2013.01); *H04M 1/274558* (2013.01)

(56) References Cited

U.S. PATENT DOCUMENTS

| | | |
|---|---|---|
| 7,411,939 B1 | 8/2008 | Lamb et al. |
| 7,599,355 B2 | 10/2009 | Sunstrum |
| 7,876,213 B2 | 1/2011 | Angelo et al. |
| 2002/0141394 A1* | 10/2002 | Hardisty ............ H04L 12/18 370/352 |
| 2003/0002448 A1* | 1/2003 | Laursen ............ H04L 12/1827 370/261 |
| 2003/0053434 A1 | 3/2003 | Chow et al. |
| 2003/0058806 A1 | 3/2003 | Meyerson et al. |
| 2005/0122389 A1 | 6/2005 | Miao |
| 2006/0187900 A1 | 8/2006 | Akbar et al. |
| 2007/0058545 A1 | 3/2007 | Nookala et al. |
| 2007/0291108 A1 | 12/2007 | Huber et al. |
| 2008/0159507 A1 | 7/2008 | Virolainen |
| 2008/0233990 A1 | 9/2008 | Jen |
| 2010/0040046 A1* | 2/2010 | Ko ............ H04L 29/125 370/352 |
| 2010/0159898 A1 | 6/2010 | Krzyzanowski et al. |
| 2012/0190325 A1 | 7/2012 | Abu-Hakima et al. |
| 2013/0121133 A1* | 5/2013 | Anchan ............ H04W 4/00 370/216 |

OTHER PUBLICATIONS

Model 352-701 and 352-703, Division 1 VoIP Telephones, GAI-TRONICS® Corporation, a Hubbell Company, Pub. 42004-456A, www.GAI-TRONICS.COM, Jan. 2012, 20 pages.

Model 352-001, 352-002, 352-003, and 352-004, Division 1 Telephones, GAI-TRONICS Corporation, a Hubbell Company, Pub. 42004-454A, www.GAI-TRONICS.COM, Dec. 2011, 13 pages.

Model 352-7xx and 352-8xx Division 1 VoIP Page Phones—Wired & WiFi, GAI-TRONICS® Corporation, a Hubbell Company, Pub. 42004-486A, www.GAI-TRONICS.COM, May 2014, 28 pages.

VoIP Telephones, VoIP Telephone Configuration Guide, GAI TRONICS a Division of Hubbell Ltd.; Document Ref: 502-20-0119-001, Issue 3, Apr. 2013, 88 pages.

Equipment Specification, GAI-TRONICS Voice Over Internet Protocol (VOIP) and WiFi VoIP Telephone Products, GAI-TRONICS®, a Hubbell Company, May 18, 2012; 31 pages.

Page/Party® Solutions, GAI-TRONICS®, a Hubbell Company; Pub. 980500, Rev. Sep. 2010, 8 pages.

Introducing . . . WiFi Paging Telephone, http://www.gai-tronics.com/whatnew/wifi_paging_telephone.html, printed Aug. 27, 2013, 2 pages.

"ADVANCE SmartSeries™ Solutions for Facility Communications & Emergency Notification Systems," GAI-TRONICS, Pub. 961109, Rev. Mar. 2013, 12 pages.

* cited by examiner

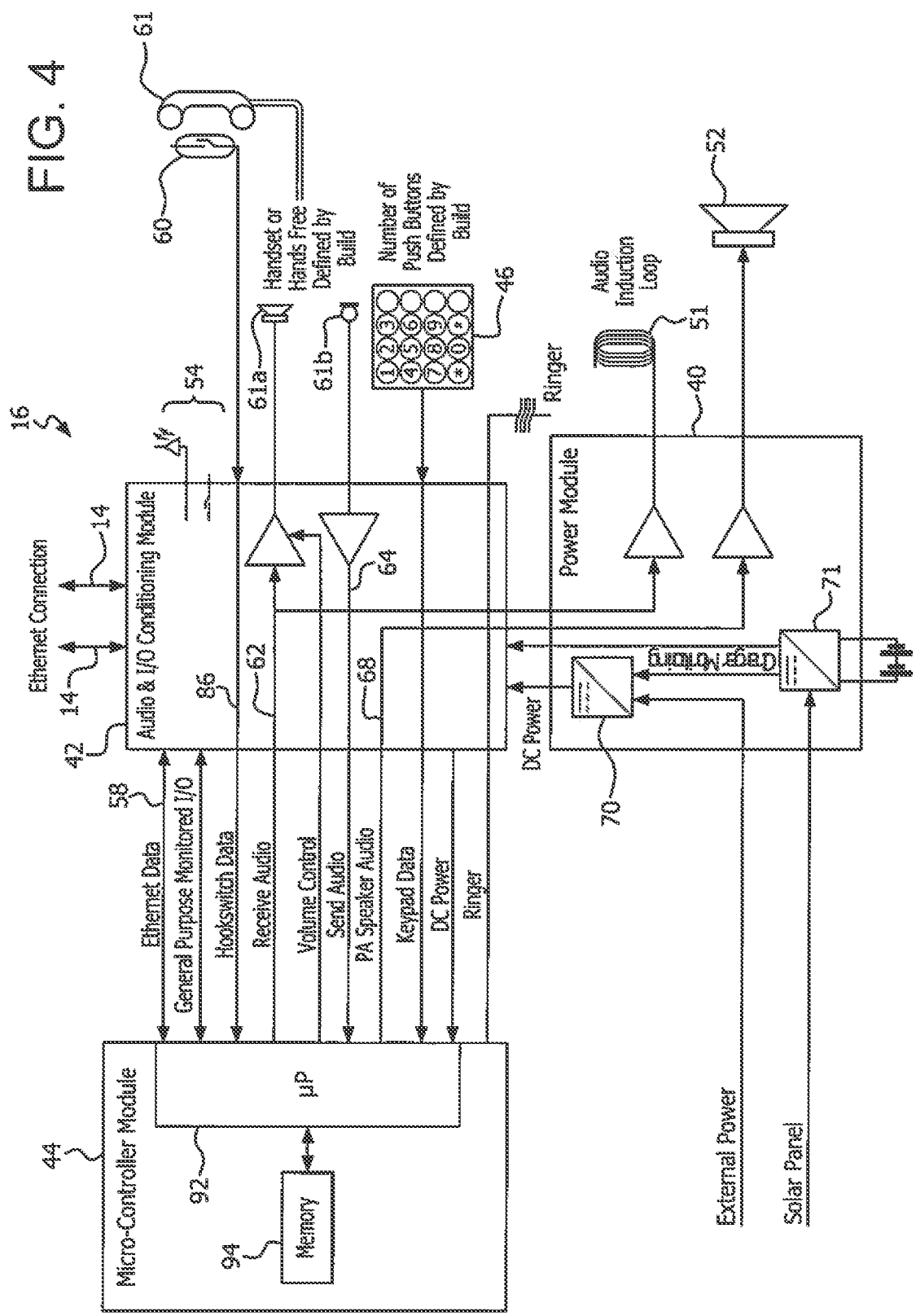

SYSTEMS, APPARATUSES AND METHODS FOR PARTY LINE CALLS AMONG VOICE OVER INTERNET PROTOCOL (VOIP) TELEPHONES

This application claims the benefit of U.S. provisional application Ser. No. 62/469,620, filed Mar. 10, 2017, the entire content of which is incorporated herein by reference.

BACKGROUND OF THE INVENTION

Field of the Invention

The present invention relates to systems, methods and apparatuses for VoIP telephones configured to be connected to an IP network (e.g., via fiber optic cables) and communicate with similarly configured VoIP telephones to achieve a party fine function with automated joining of a party line call.

Description of Related Art

Robust communications equipment and networks are often needed in environments subject to weather extremes and possible vandalism such as a railway system or subway system. For example, a railway system can have a number of robust analog telephones installed at one or more train station(s) and along passenger platforms and in service or maintenance areas and along the railway track (i.e., trackside). The telephones can be relatively simple (e.g., a hands free configuration or handset configuration) and have, for example, only one or two user buttons for dialing. For example, a hands free telephone can have a dedicated button or a handset telephone can "hot dial" upon lifting the handset to dial an operator (e.g., to report a condition or request assistance). In electrified transport networks (e.g., railway tracks, mining conveyor system, and so on), a telephone can also have a second, priority button for calling the network's power control station to turn off power to the tracks or rails in an emergency situation.

Operators of transport networks can find a page party function to be useful, that is, the ability for multiple telephones or user stations to be involved on the same call. An approach that allows multiple telephones or user stations to be involved on the same call uses a network backbone as the communications infrastructure and Voice over Internet Protocol (VoIP) devices. With VoIP networks, multiple "channels" can be utilized over a single cable, it can be possible to deploy multiple IP devices across an existing network backbone, reducing the cost of added cabling infrastructure significantly. Such traditional VoIP solutions require the use of a VoIP exchange in much the same manner that an analog telephony system would require an exchange.

Analog telephony systems, however, have many desirable functions that are not available in traditional VoIP systems. For example, in an analog system such as a residential system of parallel connected analog telephones, a first user of a telephone in one location (e.g., in the kitchen) can be speaking to a called party, and second and third users of other telephones (e.g., in the living room and in a bedroom) can automatically join the call to the called party with the first user by merely lifting the handset.

Such a multi-party auto joining function can be desirable in a communication system for a distributed transport network or other distributed system that also employs VoIP technology and enjoys the advantages of VoIP such as tower cost and less cumbersome cabling. A need therefore exists for a VoIP unit or end point that can act as a conference bridle between an operator extension and other telephone end points. A need also exists for a VoIP solution for a communication network wherein multiple parties can automatically join a conference call or party call.

SUMMARY OF THE INVENTION

The above and other problems are overcome, and additional advantages are realized, by illustrative embodiments of the present invention.

It is an aspect of illustrative embodiments of the present invention to provide a voice over internet protocol (VoIP) unit that supports a party call functionality with auto-joining comprising: a VoIP control module for VoIP operations among VoIP units in an Internet Protocol (IP) network, the VoIP control module configured to selectively establish point-to-point communication between its VoIP unit and another VoIP unit, and multicast communication among a plurality of the VoIP units; an IP network interface module connected to the VoIP control module and to the IP network and configured to exchange bi-directional Ethernet data between the IP network and the VoIP control module; a speaker; a microphone; and a user input device coupled to the VoIP control module for initiating a connection to at least one of an operator and one or more of the other VoIP units via the IP network; wherein the VoIP control module is further configured to initiate a call to an operator and manage a party call with one or more of the other VoIP units, and to join a party call initiated by another one of the VoIP units.

In accordance with aspects of illustrative embodiments of the present invention, the VoIP unit, the operator, and the other VoIP units are registered with a Session Initiation Protocol (SIP) server.

In accordance with aspects of illustrative embodiments of the present invention, when the VoIP unit initiates a call to the operator, the VoIP control module is further configured to mix two audio streams together comprising the VoIP unit's send audio from the VoIP unit to the operator and the operator's send audio from the operator to the VoIP unit, and to retransmit the two mixed audio streams as a multicast stream to the plurality of the VoIP units.

In accordance with aspects of illustrative embodiments of the present invention, wherein a second VoIP unit from among the plurality of the VoIP units determines if a multicast stream associated with the operator is present before initiating a call to the operator. If a second VoIP unit determines that a multicast stream associated with the operator is present, then the second VoIP unit is configured to use the multicast stream associated with the operator as send audio from the operator and to transmit its send audio on a second multicast channel; and wherein the VoIP control module of the VoIP unit that initiated the call to the operator is configured to mix the second VoIP unit's send audio from the second multicast channel into the VoIP unit's multicast stream that is broadcast to the other VoIP units and into an audio stream to the operator. If the second VoIP unit determines that a multicast stream associated with the operator is not present, then the second VoIP unit is configured to initiate a call to the operator.

In accordance with aspects of illustrative embodiments of the present invention, wherein a third VoIP unit determines that a multicast stream associated with the operator is present and is configured to use the multicast stream associated with the operator as send audio from the operator and to transmit its send audio on a third multicast channel; and wherein the VoIP control module of the VoIP unit that initiated the call to the operator is configured to mix the third VoIP unit's send audio from the third multicast channel into the VoIP unit's multicast stream that is broadcast to the other VoIP units and into an audio stream to the operator.

In accordance with aspects of illustrative embodiments of the present invention, a method of automatically joining party line communication among plural voice over internet protocol (VoIP) units operating as end points in an IP network comprises registering plural VoIP units in an IP network with a Session Initiation Protocol (SIP) server to support point-to-point and multicast communications among them; a first VoIP unit initiating a call to a second VoIP unit selected from among the plural VoIP units, the first VoIP unit mixing two audio streams together comprising the first VoIP unit's send audio to the second VoIP unit and the second VoIP unit's send audio to the first VoIP unit, and retransmitting the two mixed audio streams as a multicast stream on a first multicast channel to the plurality of the VoIP units; and a third VoIP unit from among the plurality of the VoIP units determining if a multicast stream associated with the second VoIP unit is present before initiating a call to the second VoIP unit. If the third VoIP unit determines that a multicast stream associated with the second VoIP unit is present, then the third VoIP unit uses the first multicast channel associated with the second VoIP unit as send audio from the second VoIP unit and transmits the third VoIP unit's send audio on a second multicast channel. The first VoIP unit mixes the third VoIP unit's send audio from the second multicast channel into the first VoIP unit's multicast stream that is broadcast to the other VoIP units.

In accordance with aspects of illustrative embodiments of the present invention, the second VoIP unit is an operator station and at least the first VoIP unit and the third VoIP unit each send their send audio to the operator station via the first VoIP unit's multicast stream.

In accordance with aspects of illustrative embodiments of the present invention, if the third VoIP unit determines that a multicast stream associated with the second VoIP unit is not present, then the third VoIP unit is configured to initiate a call to the operator.

Additional and/or other aspects and advantages of the present invention will be set forth in the description that follows, or will be apparent from the description, or may be learned by practice of the invention. The present invention may comprise VoIP units and systems and methods for operating same having one or more of the above aspects, and/or one or more of the features and combinations thereof. The present invention may comprise one or more of the features and/or combinations of the above aspects as recited, for example, in the attached claims.

BRIEF DESCRIPTION OF THE DRAWINGS

The above and/or other aspects and advantages of embodiments of the invention will be more readily appreciated from the following detailed description, taken in conjunction with the accompanying drawings, of which:

FIG. 4 is a block diagram of components of a VoIP unit in accordance with an embodiment of the present invention.

Throughout the drawing figures, like reference numbers will be understood to refer to like elements, features and structures.

DETAILED DESCRIPTION OF ILLUSTRATIVE EMBODIMENTS

Figure 1:
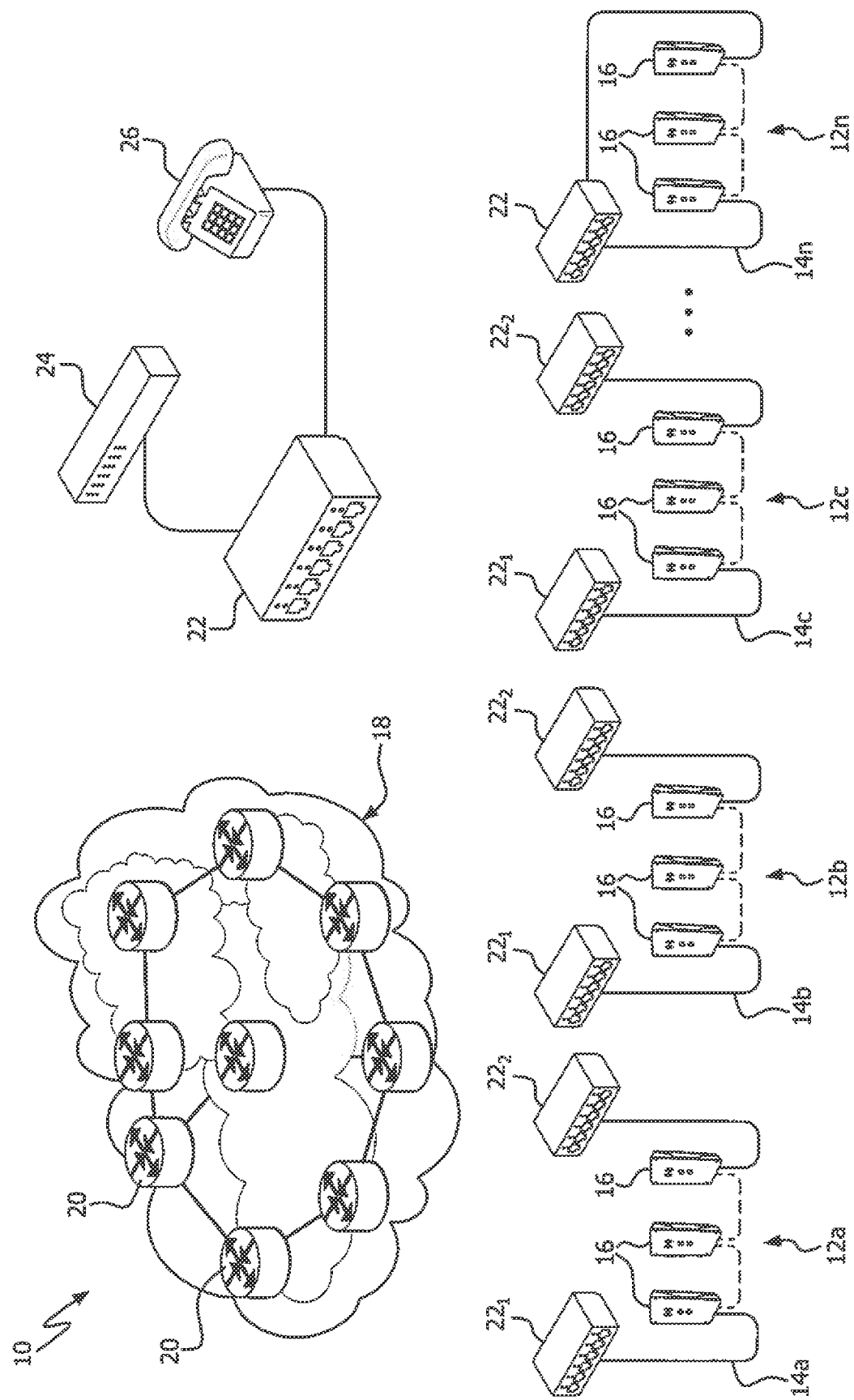
FIG. 1 depicts an Internet. Protocol (IP) network in accordance with an embodiment of the present invention.

Reference will now be made in detail to embodiments of the present invention, which are illustrated in the accompanying drawings. The embodiments described herein exemplify, but do not limit, the present invention by referring to the drawings.

The present invention is described herein as a VoIP telephone configured to be connected to an IP network (e.g., via fiber optic cables) and communicate with similarly configured VoIP telephones to achieve a party line function with automated joining of a party call. A system of such VoIP telephones is described in the context of a VoIP solution for replacing existing trackside analog telephones in a railway system for illustrative purposes. It is to be understood, however, that the VoIP telephone constructed in accordance with the present invention can be used in connection with different customers or applications besides a transportation system with rails or roadways or paths such as a network of telephones in an industrial plant, power plant or manufacturing facility, or mining system with conveyor, or multi-story parking garage, or park or golf course, for example. Further, the VoIP telephone constructed in accordance with the present invention can be hard wired (e.g., via fiber optic cables or copper) to an IP network.

Overview

Briefly, the party call or party line function can be accomplished via different implementations. For example, with a conference bridging model, a VoIP telephone (e.g., one of several optical trackside telephones in a railway system, or other end points) calls an operator when this first trackside telephone initiates a conference. Other VoIP telephones provided as trackside telephones are configured to automatically join into the conference. A SIP server is used for registration of all end points, that is, the trackside telephones and the operator stations. Each end point registers with the SIP server and is able to setup or receive calls via the SIP server either one to one (e.g., point to point) or as a member of a group (e.g., multicast). Thus, when the operator calls a group, the SIP server renders the operator group call into a call to each end point in that group.

Illustrative System 10

In accordance with an aspect of the present invention and as described in more detail below in connection with FIG. 1, a plurality of optical trackside telephones (also hereinafter referred to as "end points" 16 or "VoIP units" 16) are deployed in string or ring topologies, with each telephone being linked only to its neighbors except for the two end units or telephones 16 that are connected to a wider network via other devices. An example VoIP system 10 with party line functionality is depicted in FIG. 1, wherein each of plural groups 12a, . . . , 12n of telephones 16 has its own separate subnet and VLAN via fiber 14a, . . . , 14n to which ail group members 16 are connected (e.g., to constrain multicast packets). The use of a VLAN allows local multicast to be contained within the group 12 or string. VLAN IDs need not be unique across the system 10.

Due to the bidirectional fiber 14, switches 22 are configured for port blocking to prevent network loops. Each subnet terminates at a switch 22 that supports a spanning tree protocol (e.g., STP) to prevent network loops. Each end unit or telephone 16 in a group 12 can be connected to a switch 22₁ and 22₂, that is, there can be two network switches per string or group 12. Each switch 22 is connected to the wider network 18 via a Layer 3 router 20, Since only one router is active at a time, routers 20 can run a redundancy protocol (e.g., virtual router redundancy protocol or VRRP) so that a group 12 or string can survive a loss of one of the routers 20. The active router 20 operates as a gateway for the string subnet of a group 12. Switches 22₁ and 22₂ in a group 12 have direct connection between them (e.g., either a physical link or on OSI Layer 2 connection through a service provider) via the network cloud 18. In the event of a loss of a link within a string of a group 12, a route remains from each telephone 16 to the active router 20 or gateway and from each telephone 16 to all of the other telephones 16 in the string (for multicast conferencing).

With continued reference to FIG. 1, a SIP server 24 and operator station 26 are also connected to the cloud 13. Connections to the "cloud" or network 18 are omitted from FIG. 1 for clarity. As stated above, the network 18 consists of routers 20 forming a single Layer 3 network architecture, supporting multiprotocol label switching (MPLS) or similar data-carrying protocol. To achieve redundancy, the VoIP telephones are connected in a fiber ring 14, connected to the wider network 18 by means of network routers 20. It is possible, however, to have a spur (i.e., only one end terminates at a switch 22), resulting in a loss of redundancy. The network 18 to which the fiber rings 14 of groups 12 are connected is configured to allow large numbers of groups 12 to be deployed, and with a group 12 having as many as 20 telephones 16, for example, or more telephones. The network 18 allows telephones 16 in any group 12 to communicate with a common SIP server 24 in the network without conflict. In addition, the groups 12 have sufficient resilience to survive a loss of any one telephone 16 or link associated with each group 12.

Illustrative Example of Party Line Functionality

Figure 2:
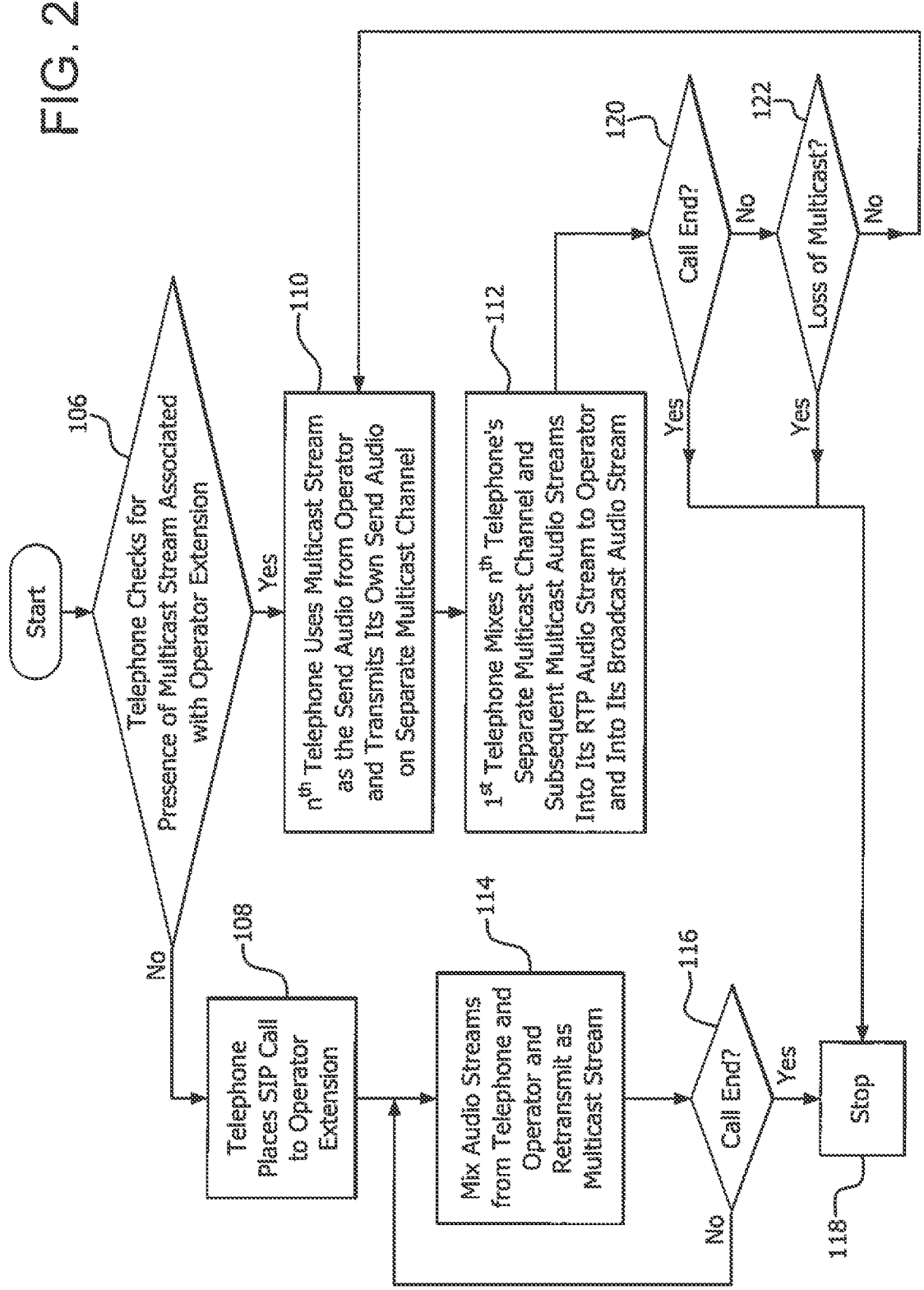
FIG. 2 is a flow chart depicting operations for party call functionality among VoIP units in accordance with an embodiment of the present invention.

The party line functionality among VoIP telephones is illustrated in the flowchart in FIG. 2, in accordance with an illustrative example, a first trackside device 16 makes a SIP call to the operator 26 (blocks 106 and 108), and multicasts a stream comprising a mix of its send audio and the received operator audio (block 114). All of the other local end points (e.g., other trackside devices 16) are configured to be listening on the relevant port. If a second end point 16 goes off hook, it first checks to see if it is receiving multicast traffic before making a SIP call to the operator 26 (block 106). If it is receiving multicast traffic (e.g., the multicast from the first trackside device), then it plays out the received audio over its speaker and multicasts its send audio on a separate multicast channel (block 110). The end point that initiated the call (e.g., the first trackside device) mixes this second stream into its Real-time Transport Protocol (RTP) stream to the operator (block 112). Effectively, the initiating end point acts as the conference bridge to the operator. All of the end points are responsible for mixing received multicast streams for their local speaker. The number of simultaneous multicast streams that can be mixed can be limited. If multicast traffic associated with the intended SIP end point to be called is not detected by an end point 16, then that end point would place a SIP call to the operator 26.

More specifically, and with continued reference to FIG. 2, when a SIP call is instigated between a telephone end point 16a and an operator end point 26 (block 108), RTP packets are sent bi-directionally between the two end points carrying the two voice elements of the call, that is, the send audio from the telephone end point 16a to the operator end point 26 and the send audio from the operator end point 26 to the telephone end point 16a. This first telephone end point 16a (e.g., VoIP telephone constructed in accordance with illustrative embodiments of the present invention) mixes the two audio streams together and re-transmits them as a multicast stream (block 114).

With continued reference to FIG. 2, before another telephone end point 16b places a call to the same operator extension 26, it checks for the presence of the multicast stream associated with that operator extension 26 (block 106). If it does not detect the presence of the requisite multicast stream, then the other telephone end point 16b places a SIP call to the operator extension 26 (block 108). If it does detect the presence of a requisite multicast stream, then the other telephone end point uses this multicast stream as the send audio from operator end point 26 and transmits its own send audio on a separate available multicast channel (block 110). The telephone end point 16a that originally instigated the SIP call to the operator extension 26 mixes this second multicast stream and any subsequently received multicast audio streams into its send RTP audio stream to the operator extension 26 and into its broadcast audio multicast stream (block 112).

Subsequent telephone end points 16n act in the same manner as end point 16b to join the party line call initiated by end point 16a. If either the instigating end point (e.g., first trackside device 16a) or operator 26 terminate the call, all instances terminate (blocks 116, 118 and 122). If the call has not been terminated by the instigating end point or operator 26, but is terminated by any of the other telephone end points 16b, . . . , 16n, then their respective instance terminates (block 120). The call can also be terminated by an optional Call Limit Timer out. If the call has not been terminated by the instigating end point or operator 26, but any of the other telephone end points 16b, . . . , 16n has loss of multicast, then their respective instance terminates (block 122).

Illustrative VoIP Telephone 16

The user interface to a typical trackside fiber optic-connected VoIP hands free telephone 16 typically consists of a speaker 61a, microphone 61b, an optional push to talk (PTT) non latching push button and, for a trackside telephone 16, a memory number auto dial/hook switch non-latching push button(s) described below in a connection with FIGS. 3A, 3B and 4. Some VoIP units 16 may have up two separate memory number auto dial non-latching push buttons (e.g., buttons 47a and 47b in FIG. 3B). The microphone 61b on the unit 16 will remain muted unless the PTT is depressed. On receiving a call, the alerting ring tone will be emitted from the speaker 52. The power requirements for these VoIP telephones 16 can be fulfilled from batteries charged by a local solar panel, for example. If a call is in progress, then pressing a memory number auto-dial push button will end the call; otherwise, it will initiate a call to a preprogrammed number. Where a VoIP unit 16 has been fitted with two memory number auto-dial push buttons 47a, 47b as illustrated in FIG. 3B, for example, pressing either push button will end a call that is in progress or initiate a call to the preprogrammed number associated with that push button. Buttons can be optionally prioritized. It can also be optional for a push button to end a call if in its configuration. The number of fitted push buttons is only limited by the number required for the application.

For hands free telephones 16 intended for public use such as at railroad level crossing, the power requirements can be fulfilled by a permanent supply to the unit 16. Memory number auto dial push buttons can be configured to only instigate calls. Calls can be configured to only be terminated by the end party with the exception of a memory number auto dial push button that has been configured as Priority. For example, where a unit 16 has been fitted with two memory number auto-dial push buttons, one of the push buttons can be configured as Priority such that, upon pressing the Priority push button, this will end a non-Priority call that is in progress and/or initiate a call to the preprogrammed number associated with that push button.

Telephones connected on the same fiber segment 14 are assigned IP addresses on the same local subnet. Each fiber segment 14 has a unique local subnet. The number of trackside end points 16 on a given fiber segment 14 or local subnet can be limited (e.g., up to 20 end points 16, or other number of end points 16).

In the illustrated example of a VoIP system 10 such as a trackside telephone communication system, the vast majority of the trackside telephones 16 can be fitted with only a single memory number auto dial push button, and the number associated with it will be for a control room operator 26 responsible for the particular section of railway where the telephone 16 is located.

Initiating a Call from the Trackside

With no call currently in progress, pressing a memory number auto dial push button on a trackside telephone 16 instigates a SIP call to the number associated with the push button such as the number assigned to an operator 26, The telephone of the called party (e.g., the operator 26) commences ringing and answers the incoming call, such as when the operator 26 takes the telephone off hook. Two-way speech is established between the end points (i.e., the calling trackside telephone 16 and the called operator 26's station) but, if the optional PTT push button is fitted to the calling telephone 16, the microphone of the trackside telephone 16 is muted unless the PIT is depressed. The call is terminated when either party hangs up.

Initiating a Call from the Control Room

With no call currently in progress, the operator 26 can initiate a SIP call to a specific end point 16. The end point 16 commences ringing and answers the incoming call, such as when the user takes the telephone 16 off hook (e.g., by pressing a push button, or removing a handset 61 from a cradle with a hook switch sensor). Only the end point 16 to which the operator 26 made the call rings. Two-way speech is established between the end point 16 and the operator 26 station but, if the optional PTT push button is fitted to the trackside telephone 16, the microphone of the called trackside telephone 16 will be muted unless the PTT is depressed. The call is terminated when either party (e.g., the called telephone 16, or the operator 26) hangs up. If the operator 26 needs to be able to ring a number of trackside end points 16, then these numbers will be configured to be part of a Group 12 in the SIP exchange. The operator can then call the Group 12n extension, which causes all of the trackside end points 16 to ring at once. The first user to answer one of the ringing trackside telephones 16 is connected to the operator 26, and all of the remaining trackside telephones 16 cease to ring.

Party Call Functionality

If a memory number auto dial push button (e.g., button 47a in FIG. 3B) is pressed on another unit 16 which is in the same local subnet of the group 12, then this end point automatically joins the already in-progress call (i.e., party call) without intervention from either of the current users. There is no indication to the supplementary user(s) that a pre-existing call is in progress. The call persists until either the operator or the trackside telephone 16 user that instigated the call hangs up. This is analogous with having the trackside telephones connected in parallel on an analog telephone line. For units 16 fitted with a second memory number auto dial push button (e.g., button 47b in FIG. 3B), any call initiated as a result of pressing the second push button 47b will be distinct from any other call in progress, although the same party call functionality is available. Two, or other designated number of, different memory dial numbers are permitted on any local subset.

An illustrative VoIP unit or end point 16 will now be described with reference to FIGS. 3A, 3B, and 4. The VoIP unit 16 is a low power, fiber optic IP telephone such as a VoIP industrial telephone product available from, for example, GAI-Tronics that uses an Analog Devices Inc. digital signal processor (DSP) and standard VoIP/SIP software. The VoIP industrial telephone product has been customized to perform party line operations as described in connection with FIG. 2 in accordance with an aspect of an illustrative embodiment of the present invention.

Figure 3A:
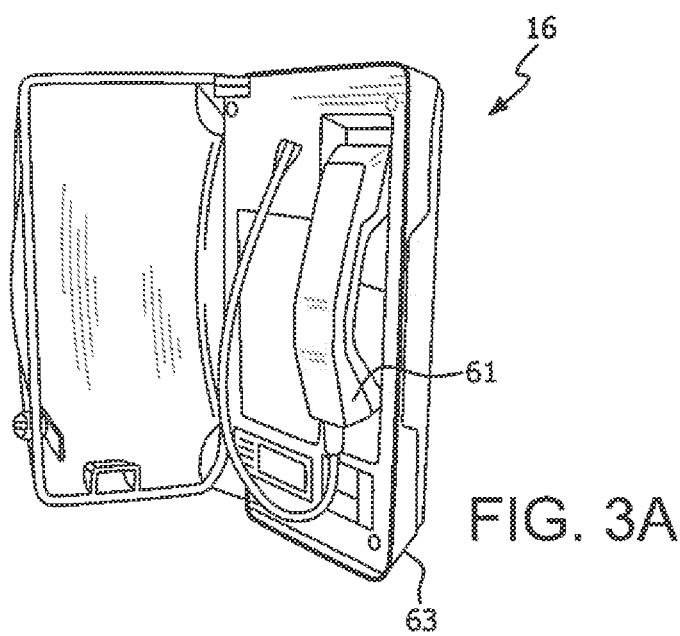
FIGS. 3A and 3B are perspective views of illustrative housings for VoIP units in accordance with embodiments of the present invention.
Figure 3B:
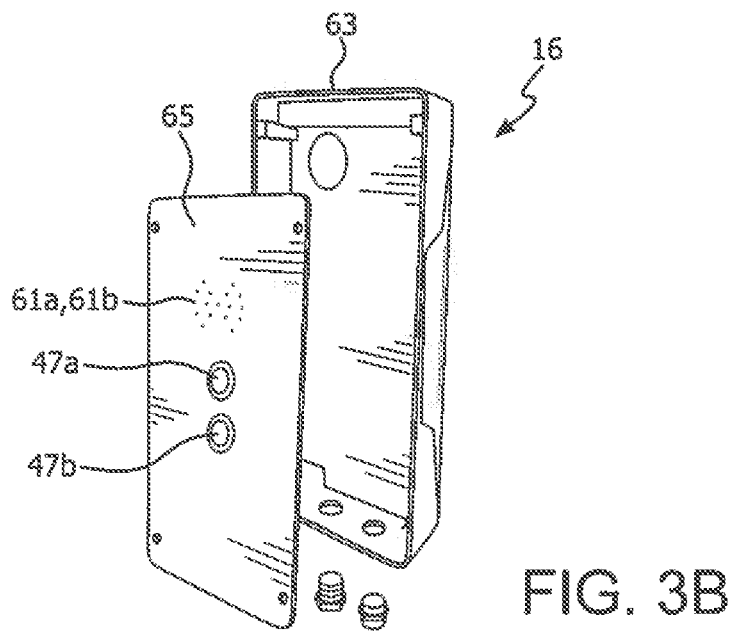

FIGS. 3A and 3B depict, respectively, example end points 16 having a handset 61 in an enclosure 63, and a no handset configuration (i.e., a speaker 61a and a microphone 61b are integrated into the faceplate 65). For example, FIG. 3A is shown with no dialer button(s) 47a, 47b such that filling the handset places a call on a predesignated "hot dial" memory number. In the application described above where end points 16 are calling either an operator station 26 or control station, for example, at least two memory number auto dial push buttons 47a, 47b can be provided as shown in FIG. 3B. It is to be understood that other keypads can be provided to allow dialing to multiple stations or groups, and other telephone functions.

For example, the VoIP unit 16 can have up to 16 pushbutton inputs to enable a user to carry out actions such as starting a call. Button functions are defined and configurable in software. Configurable functions can include, but are not limited to, memory dial to a pre-configured SIP URI, optional PTT, End call, Accept incoming call, and Toggle on off hook.

Pressing a button (e.g., button 47a or 47b) configured to make a direct call can cause the telephone 16 to initiate a call to a single end point. The called end point 16 can either be a point-to-point address or an extension on a SIP server 24. If a telephone 16 receives an incoming one-to-one call, it can be set to either ring, in which case a designated button must be pressed to accept and answer, or to automatically connect (with or without a preceding alert tone). Calls are ended either by pressing a "call end" button, by the receiving party ending the call, a configurable time out, or by the instigator of the call, if the telephone has a PTT button, its microphone will be muted in any call unless this PTT button is held pressed. When in a call, the telephone will be able to receive audio but not transmit unless the PTT button is pressed.

Example power and communication network cabling connections for an illustrative end point 16 such as a VoIP unit or telephone 16 will now be described. GAI-Tronics VoIP-SIP telephones, for example, support connection to a LAN or WAN. For example, the network connection can be via two simplex LC connectors, each utilizing single mode fiber with a bi-directional transceiver. One port can, for example, transmit at 1310 nm and receive at 1550 nm, while the other port can transmit at 1550 nm and receive at 1310 nm. Network speed is typically 100 Mb/s. A USB connector can also be provided on the printed circuit board (PCB) inside the VoIP telephone 16 to enable a direct serial connection to, for example, a laptop PC for configuration and management purposes. The connector is typically only accessible from inside the enclosure of the VoIP telephone 16.

Group 12 calls can be set up via a SIP server 24, but in this case the telephone 16 treats the group identity as a SIP extension when making a one-to-many call. Alternatively, as described below, the party line functionality described with reference to FIG. 2 allows one or more telephones 16 to automatically join a call instigated by another telephone 16 (e.g., such as a call to an operator station 26).

The server 26 is illustrated as a SIP server. By way of an example, SIP is used for messaging between end points 16 for creating, modifying and terminating point-to-point dialing, or multiparty (e.g., multicast) sessions consisting of one or several media streams. Multicast allows a single audio stream to be received by multiple end points (e.g., telephones 16) simultaneously to achieve multipoint paging or Public Address functionality over IP, as well as party line functionality in accordance with an illustrative embodiment of the present invention. While each telephone 16 is configured or enabled to receive multicast packets for multicast communications among themselves, a multicast-compliant SIP server 26 can be employed that supports multicast functionality such as a group call from an operator station 26 to end points 16.

Each VoIP unit or telephone 16 can be configured with a dedicated SIP extension identifier (ID) and can have one or more multicast addresses such that each telephone 16 can be a part of one or more groups. Accordingly, with its IP connectivity and loudspeaker, each telephone 16 enables point-to-point calling with a "ring" tone generated to the loudspeaker, or multicast operation whereby the telephone 16 is able to receive multicasts from other end points. The telephones 16 can then be configured to accept audio from one or more of these multicast addresses, in addition to point to point calls to its dedicated SIP address.

With reference to FIG. 4, a VoIP unit or telephone 16 can be provided, for example, with a VoIP control board 44, a VoIP/phone interface board 42, and a power board 40. The VoIP unit 16 is also provided with a handset 61 with integrated microphone 61b and speaker 61a or hands free microphone 61b and speaker 61a, and can also be a single board implementation. The VoIP control board 44 is described in more detail below. The VoIP/phone interface board 42 is connected to an Ethernet network (e.g., a LAN or WAN to its group 12 and to the network 18 via switch 22) wirelessly or using fiber optic cable or copper, for example, via an Ethernet interface 14. The VoIP telephone 16 can be optionally provided with individual push buttons or a keypad board 46 where applicable, such as providing two or more call buttons 47a, 47b). The VoIP unit or telephone 16 can have a power supply board 40 or, in an alternative implementation, an amplifier and power supply board 40 for operating a loudspeaker 52 to provide sufficiently loud audio output suitable for an industrial location that may have significant ambient noise levels and/or inductive loop 51.

The VoIP unit or telephone 16 is provided with a magnetic hook switch sensor 60 (e.g., coupled to the handset 61's cradle), the output of which can be coupled to the VoIP/phone interface board 42 for providing on-hook/off-hook status data 86 of the handset 61 to the VoIP control board 44. As stated above, the VoIP/phone interface board 42 is configured to provide public address (PA) speaker audio 68, as well as earpiece/speaker audio 62 from the VoIP control board 44 for the handset or hands free speaker 61a and receive microphone audio 64 from the handset or separate microphone 61b for the VoIP control board 44. The VoIP/phone interface board 42 is also configured to provide individual push buttons or keypad data from the keypad board 46 and DC power to the VoIP control board 44. LEDs and relays are provided as generally indicated at 54 for General Purpose Monitored Inputs/Outputs (I/O).

With continued reference to FIG. 4, power requirements for the VoIP telephones 16 can be fulfilled from a battery/batteries charged by an external power source or a local solar panel, for example, Power supply conditioning, the charging and condition monitoring of the battery/batteries is performed by the power supply section 70, 71. The batteries are indicated in FIG. 4 as part of a power module 40 that can be part of a single board implementation for a telephone 16. Audio 68 for a speaker 52 is shown routed through the power module 40 to allow for a public address (PA) function (e.g., where a larger amplifier is needed). An audio induction loop indicated generally at 51 enables a person using a hearing aid set to the 'T' setting to hear more clearly.

The VoIP/Phone interface board 42 and the VoIP control board 44 are configured to process Ethernet data 58. The VoIP control board 44 in a telephone 16 comprises a programmable processor 92 and memory 94. In accordance with illustrative aspects of the present invention, the telephones 16 are programmed (e.g., via software code provided to their respective processors 92) to establish and terminate point-to-point calls and participate in party line calls, among other operations in the VoIP system 10 with party line functionality. As stated above, the microprocessor 92 can be an Analog Devices Inc. ADSP-BF536 Series digital signal processor (DSP) with standard VoIP/SIP software, for example. The VoIP control board 44 employs an audio CODEC (e.g., 8 kHz G711A/U Law) to provide full duplex hands-free speech; that is, when in a call, the telephone 16's audio will be full duplex (i.e., transmit and receive simultaneously with no switching).

In accordance with an aspect of an illustrative embodiment of the present invention, a VoIP industrial telephone product is customized (e.g., via software code processed by microprocessor 92) to perform party line operations as described in connection with FIG. 2. In addition, the VoIP control board 44 is programmed to support the following protocols: Session Initiation Protocol (RFC3261), Payload for DTMF out-of-band digits (RFC2833), MIME Type Registration of RTP Payload Formats (RFC3555), Simple Network Time Protocol (SNTP), Simple Network Management Protocol (SNMP), Trivial File Transfer Protocol, Syslog Protocol (RFC3164/5424), Dynamic Host Control Protocol, Internet Control Message Protocol, User Datagram Protocol, and Internet Protocol IPv4 or IPv6.

As stated above, power requirements for the VoIP telephones 16 can be fulfilled from batteries 70, 71 charged respectively by an external power source or a local solar panel. The power consumption of the telephone 16 is kept to a minimum by keeping the processor core 92 and other hardware powered down or in sleep mode until it is actually needed. In normal idle mode, only an onboard network switch can be fully working, that is, ready to react to any network packets destined for the main telephone 16 itself. If the onboard network switch receives a packet not intended for it, the packet will merely be forwarded to the second port and not wake up the main processor 92. In this way the main, power intensive components are switched off or in low power mode until triggered by an event such as: Receipt of an appropriate packet such as the start of an incoming call or management access, Pressing a button, an alarm sensor such as low battery detection, or a timed activity such as SIP re-registration or speaker-microphone testing.

The main method of configuring the VoIP unit telephone 16 is via SNMP, for example. Additionally it is possible to configure the telephone 16 via a configuration file, which the telephone 16 can download via Trivial File Transfer Protocol (TFTP). A Command Line Interface (CLI) interface is also provided, which is available over the Universal Serial BUS (USB) serial interface and Telnet protocol.

The telephones 16 are generally connected in a ring topology as illustrated in FIG. 1, 12a . . . 12n with two attributes. First, each VoIP unit or telephone 16 controls network traffic passing through it so as to avoid packet storms, Second, should the ring be broken, for example, by the loss of one VoIP unit 16 or connecting cable 14, the network 12a . . . 12n will survive by switches 22 automatically unblocking a port to bypass the break. Recovery time from a ring break, that is, the time taken from the ring being broken to communication being re-established with remaining accessible telephones 16, is generally no greater than 10 seconds. In practice, this is achieved by utilizing network switches 22 that support spanning tree protocols that will port block.

The following faults and alarms are configured for reporting, either via Syslog or SNMP: Speaker/microphone fault, Low battery, Battery charge failure (suppressed during darkness (night time), Stuck button, Power interruption, Registration failure, Configuration failure, Cold restart, Warm restart.

It will be understood by one skilled in the art that this disclosure is not limited in its application to the details of construction and the arrangement of components set forth in the following description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments of the present invention can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the present invention can be easily construed as within the scope of the invention by programmers skilled in the art to which the present invention pertains, Method steps associated with the illustrative embodiments of the present invention can be performed by one or more programmable processors executing a computer program, code or instructions to perform functions (e.g., by operating on input data and/or generating an output). Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g. EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system, Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein, A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in the remote station, Electronic medical device, a server, or a combination thereof. In the alternative, the processor and the storage medium may reside as discrete components in a user terminal.

The previous description of the disclosed embodiments is provided to enable any person skilled in the art to make or use the present invention, Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The above-presented description and figures are intended by way of example only and are not intended to limit the present invention in any way except as set forth in the following claims. It is particularly noted that persons skilled in the art can readily combine the various technical aspects of the various elements of the various illustrative embodiments that have been described above in numerous other ways, all of which are considered to be within the scope of the invention.

The invention claimed is:

1. A voice over internet protocol (VoIP) unit comprising:
   a VoIP control module for VoIP operations among VoIP units in an Internet Protocol (IP) network, the VoIP control module configured to selectively establish point-to-point communication between its VoIP unit and another VoIP unit, and multicast communication among a plurality of the VoIP units;
   an IP network interface module connected to the VoIP control module and to the IP network and configured to exchange bi-directional Ethernet data between the IP network and the VoIP control module;
   a speaker;
   a microphone; and
   a user input device coupled to the VoIP control module for initiating a connection to at least one of an operator and one or more of the other VoIP units via the IP network;
   wherein the VoIP control module is further configured to initiate a call to an operator and manage a party call with one or more of the other VoIP units, and to join a party call initiated by another one of the VoIP units; and
   wherein the VoIP unit determines if a multicast stream associated with the operator is present before initiating a call to the operator, and
      when the VoIP unit determines that a multicast stream associated with the operator is present, the VoIP unit is configured to use the multicast stream associated with the operator as send audio from the operator and to transmit its send audio on a second multicast channel, and
      when the VoIP unit determines that a multicast stream associated with the operator is not present, the VoIP unit is configured to initiate a call to the operator; and
   wherein, when the VoIP unit initiates a call to the operator, the VoIP control module is further configured to mix two audio streams together comprising the Voila unit's send audio from the VoIP unit to the operator and the operator's send audio from the operator to the VoIP unit, and to retransmit the two mixed audio streams as a multicast stream to the plurality of the VoIP units.

2. A VoIP unit as recited in claim 1, wherein the VoIP unit, the operator, and the other VoIP units are registered with a Session Initiation Protocol (SIP) server.

3. A VoIP unit as recited in claim 1, wherein a second VoIP unit from among the plurality of the VoIP units determines if a multicast stream associated with the operator is present before initiating a call to the operator.

4. A VoIP unit as recited in claim 1, wherein, if a second VoIP unit determines that a multicast stream associated with the operator is present, then the second VoIP unit is configured to use the multicast stream associated with the operator as send audio from the operator and to transmit its send audio on a second multicast channel; and
   wherein the VoIP control module of the VoIP unit that initiated the call to the operator is configured to mix the second VoIP unit's send audio from the second multicast channel into the VoIP unit's multicast stream that is broadcast to the other VoIP units and into an audio stream to the operator.

5. A VoIP unit as recited in claim 4, wherein, if the second VoIP unit determines that a multicast stream associated with the operator is not present, then the second VoIP unit is configured to initiate a call to the operator.

6. A VoIP unit as recited in claim 4, wherein a third VoIP unit determines that a multicast stream associated with the operator is present and is configured to use the multicast stream associated with the operator as send audio from the operator and to transmit its send audio on a third multicast channel; and
   wherein the VoIP control module of the VoIP unit that initiated the call to the operator is configured to mix the third VoIP unit's send audio from the third multicast channel into the VoIP unit's multicast stream that is broadcast to the other VoIP units and into an audio stream to the operator.

7. A method of automatically joining party line communication among plural voice over internet protocol (VoIP) units operating as end points in an IP network comprising:
   registering plural VoIP units in an IP network with a Session Initiation Protocol (SIP) server to support point-to-point and multicast communications among them;
   a first VoIP unit initiating a call to a second VoIP unit selected from among the plural Von) units, the first VoIP unit mixing two audio streams together comprising the first VoIP unit's send audio to the second VoIP unit and the second VoIP unit's send audio to the first VoIP unit, and retransmitting the two mixed audio streams as a multicast stream on a first multicast channel to the plurality of the VoIP units;

a third VoIP unit from among the plurality of the VoIP units determining if a multicast stream associated with the second VoIP unit is present before initiating a call to the second VoIP unit;

if the third VoIP unit determines that a multicast stream associated with the second VoIP unit is present, then the third VoIP unit uses the first multicast channel associated with the second VoIP unit as send audio from the second VoIP unit and transmits the third VoIP unit's send audio on a second multicast channel;

the first VoIP unit mixing the third VoIP unit's send audio from the second multicast channel into the first VoIP unit's multicast stream that is broadcast to the other VoIP units.

8. A method of automatically joining party line communication among plural VoIP units as recited in claim 7, wherein the second VoIP unit is an operator station and at least the first VoIP unit and the third VoIP unit each send their send audio to the operator station via the first VoIP unit's multicast stream.

9. A method of automatically joining party line communication among plural VoIP units as recited in claim 7, wherein, if the third VoIP unit determines that a multicast stream associated with the second VoIP unit is not present, then the third VoIP unit is configured to initiate a call to the operator.

* * * * *